March 29, 1927.
H. GUNKEL
1,622,581
NUT LOCK
Filed July 26, 1926
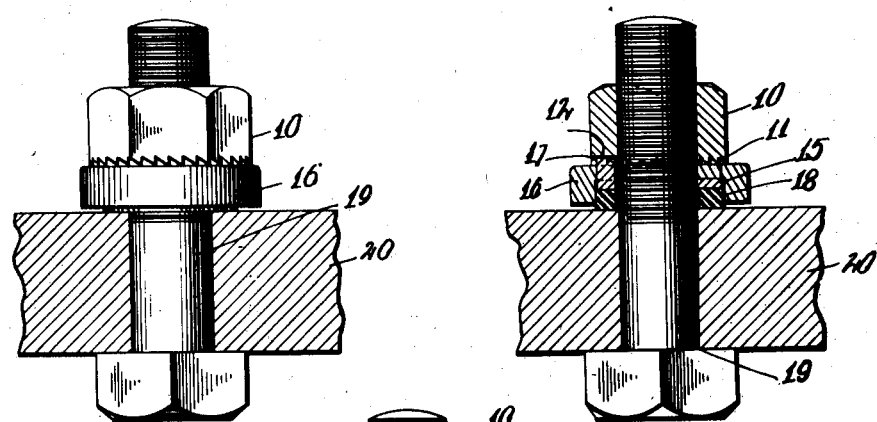
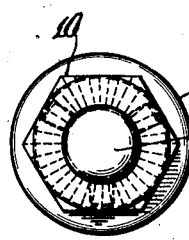
Fig. 1.
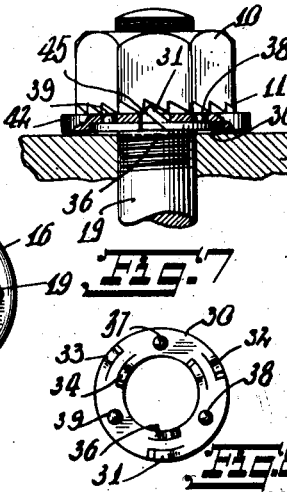
Fig. 2.
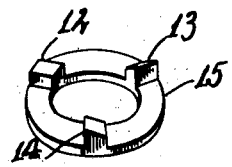
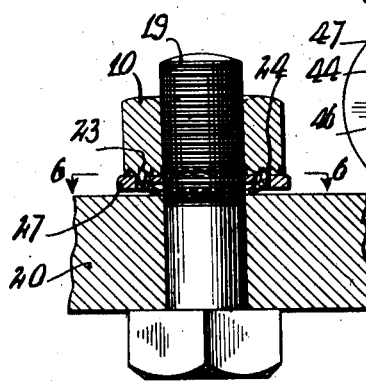
INVENTOR
Hermann Gunkel
BY
ATTORNEY Patented Mar. 29, 1927.

1,622,581

UNITED STATES PATENT OFFICE.

HERMANN GUNKEL, OF NEWELL, PENNSYLVANIA.

NUT LOCK.

Application filed July 26, 1926. Serial No. 124,904.

This invention relates to improvements in nut locking devices, and has for its object to provide an article of this character which will withstand the loosening effects of vibration and will at all times keep the nut securely set on the bolt and with its intervening elements bearing against the material to which it is applied.

A further object is the combination of resilient capacity with mechanical elements.

These and other objects and advantages will be fully disclosed in the following specification and illustrated in the accompanying drawings, in which:—

Fig. 1 shows a side view of the device with the nut engaging a bolt and with its lower elements bearing against a fragmentary section of material.

Fig. 2 shows a similar view, but with the nut and washer elements in section.

Fig. 3 shows a top plan view.

Fig. 4 shows the locking element having upward disposed beveled stop members.

Fig. 5 shows in section, another form of the invention.

Fig. 6 shows a section on the line 6—6 of Figure 5.

Fig. 7 shows a third form of the invention, a portion being broken away to disclose certain elemental features.

Fig. 8 shows the locking element as illustrated in Figure 7.

Fig. 9 shows the intervening washer as also illustrated in Figure 7.

Referring to Figures 1, 2, 3 and 4 of the drawings and more particularly to Figure 2 thereof, the device comprises a nut 10 having ratchet teeth 11 on its bottom surface, which teeth are adapted to engage the stop members 12, 13 and 14 of the locking element 15 shown in Figure 4. These stop members project upward through perforations in the washer 16 as shown at 17 in Figure 2. Beneath the washer 16 is placed a resilient element 18 which, as here applied, may be of rubber, or any suitable material.

In Figures 1, 2 etc. the device is shown with the nut engaging a bolt 19 and with its elements bearing against the material 20.

It will be seen that when the nut is turned in the required direction to tighten the bolt, the resilient element permits of the rise and fall of the stop members and gives a ratchet action in conjunction with the teeth of the nut element. As the bolt is drawn tight, the elements finally come to rest at a point where this action is no longer possible and the materials to be clamped together are firmly set in position. Any tendency of the nut to reverse, or become loosened after being set in this manner, is resisted and obviated by the engagement of the said stop members with the ratchet teeth as illustrated.

It will also be seen that should the nut be set with a degree of pressure considerably short of the maximum, the resilient action as shown and described would still resist the loosening of the nut.

Now, with reference to the form shown in Figures 5 and 6 of the drawings, the lock element 22 which is the equivalent of that shown at 15 in the previous figures, comprises a spring tempered body having upward disposed members as those shown at 23 and 24 which engage the ratchet teeth of the nut element, passing first through the perforations as shown at 25, 26 etc. in the washer 27 shown in Figure 6. This washer is the equivalent of that shown at 16 in the previous figures. In this form of the invention the locking element combines the resilient characteristic with the stop members, the action of the said stop members being similar to that previously described.

In Figures 7, 8 and 9, a form of the invention is illustrated in which the locking element 30, which is the equivalent of those already described and numbered 15 and 22 respectively, is formed of spring tempered material and has its stop members partially sheared and struck up from the body thereof as shown at 31, 32 and 33. Other similar members are formed in the same manner and disposed downward. These are shown at 34, 35 and 36. Studs 37, 38 and 39 are embossed, or otherwise affixed on the face of the element. The washer 42, which is the equivalent of that shown at 16 in Figure 2 and also shown in Figure 5 of the drawings, is provided with perforated slots 43, 44 and 45 and with perforations 46, 47 and 48.

When assembled, the embossed portions of the locking element 30 engage the perforations of the washer 42, and the stop members 31, 32 and 33 project upward through the slots in the said washer. Now, with especial reference to Figure 7, it will be seen that the stop member 31 engages the adjacent ratchet tooth and the member 36, being turned downward is in contact with the surface of the clamped material 20 and adapted to engage same in frictional resistance when under pressure of reversal from the elements above it. Both of these members, together with the other similar members of the element, being spring tempered are adapted to provide the resilient characteristic before mentioned and described.

Having thus described my invention, what I claim as new and desire to secure by Letters Patent, is as follows:

1. In a device of the class described, the combination with a bolt engaged through certain material, of a nut threadedly engaged on the bolt, and formed with ratchet teeth on the base portion thereof, a washer on the bolt, beneath the nut, and formed with a series of slotted perforations, and a series of other perforations, a locking element positioned beneath the washer, projecting portions from the locking element engaging in the latter mentioned perforations, outer marginally disposed and upwardly inclined stop members on said locking member, and passing through the said slotted perforations in the washer, and engaging the ratchet teeth of the said nut, and inner marginally disposed and downwardly inclined members on said locking member, and engageable against the said certain material to hold the locking member from gradually turning due to certain vibrations.

2. In a device of the class described, the combination with a bolt engaged through certain material, of a nut threadedly engaged on the bolt, and formed with ratchet teeth on the base portion thereof, a washer on the bolt, beneath the nut, and formed with a series of slotted perforations, and a series of other perforations, a locking element positioned beneath the washer, projecting portions from the locking element engaging in the latter mentioned perforations, upwardly inclined stop members on said locking member, and passing through the said slotted perforations in the washer, and engaging the ratchet teeth of the said nut, and downwardly inclined members on said locking member, and engageable against the said certain material to hold the locking member from gradually turning due to certain vibrations.

In testimony whereof I have affixed my signature.

HERMANN GUNKEL.